3,165,753
PREPARATION OF 1-ALKYL-3,5-DINITRO-1,2,4-TRIAZOLE
Newton Rosser Smith and Richard Haven Wiley, Louisville, Ky., assignors, by mesne assignments, to the United States of America as represented by the Secretary of the Navy
No Drawing. Filed May 3, 1957, Ser. No. 656,993
3 Claims. (Cl. 260—308)

This application is a continuation-in-part application of our application Serial No. 516,338 filed in the U.S. Patent Office on June 17, 1955, and now abandoned, for "Preparation of Explosive Compounds."

This invention relates to a new process for the preparation of 1-alkyl-3,5-dinitro-1,2,4-triazoles.

In accordance with this invention, 1-alkyl-3,5-dinitro-1,2,4-triazoles are prepared by alkylation of 3,5-dinitro-1,2,4-triazole in ether. 3,5-dinitro-1,2,4-triazole is prepared by the diazotization of guanazine, followed by recovery with ether extraction, as more fully set forth in our co-pending continuation-in-part application Serial No. 657,456 filed in the U.S. Patent Office on May 6, 1957, now U.S. Patent No. 3,111,524. The present process has the advantage that it eliminates formation and handling of the highly explosive intermediate silver salt of 3,5-dinitro-1,2,4-triazole, a hazardous step of the prior process for preparing 1-alkyl-3,5-dinitro-1,2,4-triazoles. It has the further advantage that the 1-alkyl-3,5-dinitro-1,2,4-triazoles can be prepared without the isolation of 3,5-dinitro-1,2,4-triazole.

The following example is illustrative of the invention but is not limiting thereof. A one liter 3-necked, round-bottomed flask was placed in a heated water bath and fitted with a stirrer, thermometer, and a dropping funnel. A small opening was provided in the closure for escaping gases. 225 grams of sodium nitrite were added to 300 cc. of water in the flask and the temperature raised to between 90 and 95° C. Thirty grams of guanazine hydrobromide were then weighed into a beaker and 75 cc. of water added. To this was added 13.6 grams of sodium bicarbonate and the suspension was warmed until solution was complete and gas evolution ceased. While the guanazine hydrobromide was being neutralized, 76 grams of copper nitrate trihydrate were added to the sodium nitrite solution in the flask. Then the warm solution of guanazine was added dropwise to the copper nitrate solution while the reaction temperature was maintained at between 90 and 95° C. After the addition was completed, the solution was stirred at a temperature between 90° and 100° C. for between one and two hours, cooled to room temperature and filtered on a Buchner funnel. The filtrate was carefully acidified with 150 cc. of concentrated nitric acid. After standing several hours, the acidified filtrate was extracted with 500 cc. of ether. The ether extract was in turn extracted with a thick aqueous slurry of sodium bicarbonate until the evolution of carbon dioxide ceased. This extraction of the acidified mother liquor was repeated four times using the original ether. The combined sodium bicarbonate extracts were filtered and 18–20 cc. of dimethyl sulfate added to the solution with rapid stirring. At the end of about five hours the 1-methyl-3,5-dinitro-1,2,4-triazole was solidified and was then filtered, washed with water and air dried. In some cases it was found that neutralization of the filtrate from the methylation reaction and further treatment with dimethyl sulfate produces a better yield. The yield in this case was about 9 grams (31%). The product had a melting point between 92 and 95° C. On recrystallization from isopropyl alcohol, it melted at between 95 and 98° C. Other 1-alkyl-3,5-dinitro-1,2,4-triazoles may be prepared by the above process.

Guanazine hydrobromide may be prepared from hydrazine and cyanogen bromide according to the following preferred procedure carried out under a hood because of the toxicity of cyanogen bromide. A three-necked flask is placed in an ice bath and fitted with a mechanical stirrer and a 110° thermometer. Three hundred ml. of water is added and cooled below 5°; then 121 g. of 100% hydrazine (3.78 moles) is added slowly with stirring. Two hundred grams (1.89 moles) of cyanogen bromide is added in approximately one hour, keeping the temperature below 35°. After this addition, the mixture is stirred for 15 minutes and then another 200 g. (1.89 moles) of cyanogen bromide is added in about 15 minutes. The mixture is stirred for about two hours and allowed to stand 12 hours without stirring. Two hundred ml. of isopropyl alcohol is added, the mixture is stirred and then filtered on a Buchner funnel with suction. The precipitate is washed with 200 ml. of isopropyl alcohol. The air dried yield is 190–250 g. (52–68%), M.P. 252–7° with decomposition.

1-methyl-3,5-dinitro-1,2,4-triazole has the following properties which make it useful as a high explosive: melting point—95–98° C.; impact sensitivity (2.5 kg. wt.)—154 cm.; thermal stability (100° C.)—0.72 cc. gas/gram; ignition temperature—400° C.; crystal density—1.676; heat of combustion—414.5 Kcal. per mole.

1-methyl-3,5-dinitro-1,2,4-triazole is typical of this class of new explosives. The utility of the class is illustrated by the following examples illustrating the utility of the above compound.

Pure 1-methyl-3,5-dinitro-1,2,4-triazole as a loose powder, screened through a standard 30 mesh sieve is hand tapped into a cardboard tube of one inch inside diameter with a wooden pestle to a bulk density of at least 1.0 and packed to a height of 10 inches. This is surmounted by a cylindrical booster explosive pellet of tetryl, for example, one inch in diameter and one inch long pressed to a density of 1.55 and containing a well ¾ inch deep into which is inserted a conventional electrical blasting cap. Preferably an Army Engineer Corps electric blasting cap is used. Upon proper electrical initiation of the latter the entire charge explodes with great violence. The compound may be used for blasting and analogous applications for this type explosive.

1-methyl-3,5-dinitro-1,2,4-triazole is cast loaded into containers in explosive devices, such as, artillery casings, much in the same manner as is commonly used for TNT. This procedure is well known to those skilled in the art and is described in Department of the Army Technical Manual TM9–1910 entitled "Military Explosives," dated April 1955. The explosive melts at 98° C. and is stable and reasonably safe to handle in the melted state so that it can be poured into a space in an explosive device and allowed to solidify. This technique is extremely useful for irregularly shaped or very large warhead spaces where a pressing technique is almost impossible. Thus a warhead space in an artillery shell of approximately 6" inside diameter by 18" deep with tapered shape near the top is conveniently filled in this manner. The shell body is preheated to the casting temperature 98° C. so that quick solidification on cold walls is avoided. The explosive previously melted in a steam heated container is poured into the shell body and the whole allowed to cool slowly by standing for some hours until solidified and cooled to room temperature. A density of the explosive charge of 95% of the crystal density of the pure explosive is thus obtained. Then a well, 4" deep and 1¼" in diameter is drilled into the explosive charge by a water flushed drill in a manner familiar to those skilled in the art and a booster explosive of tetryl or similar material pressed to a density of at least 155 g./cc. inserted in this well. This is commonly located in either the nose or rear end of the shell. The tetryl booster in turn contains a small well into which is fitted an electric blasting cap or a detonator of conventional design. Upon proper initiation of the blasting cap or fuze by techniques well known to those skilled in the art and described in part in Department of the Army Technical Manual FM5–25 entitled "Explosives and Demolitions," the entire explosive charge detonates with great violence hurling the steel fragments of the shell outwards with a high velocity and causing great damage to nearby surroundings by the concussion and blast from the explosion. In addition to its use as the explosive in artillery shells, the compound may be used as a blasting explosive according to methods described in Army Technical Manual FM5–25, entitled "Explosives and Demolitions."

The compounds may be used in combination with additives. For example, there may be mixed with them TNT or aluminum powder to enhance blast effects, RDX to increase power, and ammonium nitrate to reduce the cost of the composition. When used with additives, the additives and explosive in powder form are thoroughly mixed before the explosive is cast. The compositions are detonated with standard electric blasting caps and detonators in accordance with the manner set forth above for artillery shells.

From the above description of the invention, it is seen that there has been provided an improved method for the preparation of 1-methyl-3,5-dinitro-1,2,4-triazole which is safe and practicable.

Obviously, modifications and variations of the present invention are possible in the light of the above teachings. It is, therefore, to be understood that within the scope of the appended claims the invention may be practiced otherwise than as specifically described.

What is claimed is:

1. The process for the preparation of 1-alkyl-3,5-dinitro-1,2,4-triazoles in which the alkyl group is a lower alkyl group, which comprises adding guanazine dropwise to a copper nitrate solution at a temperature between about 90 to 95° C., stirring the resulting solution for about 1 to 2 hours at about 90 to 100° C., filtering the solution, acidifying the filtrate with concentrated nitric acid, extracting the filtrate with ether, extracting the ether extract with a slurry of sodium bicarbonate, and adding to the final extract a slight excess of a dialkyl sulphate in which the alkyl groups are lower alkyl groups.

2. The process of claim 1 in which the dialkyl sulfate is dimethyl sulphate.

3. The process for the preparation of 1-methyl-3,5-dinitro-1,2,4-triazole, which comprises making a solution of sodium nitrite and copper nitrate trihydrate in water in a ratio of about 3 to 1, adding, dropwise, a solution of guanazine hydrobromide and sodium bicarbonate in water in a ratio of about 2 to 1 while maintaining the temperature of the solution at about 90 to about 95° C., stirring the solution for about 1 to 2 hours at a temperature between approximately 90 to 100° C., cooling and filtering the solution, acidifying the filtrate with concentrated nitric acid, allowing the filtrate to stand for several hours, extracting the filtrate with ether, extracting the ether extract with a slurry of sodium bicarbonate, and adding a slight excess of dimethyl sulfate.

No references cited.

IRVING MARCUS, *Primary Examiner.*

R. L. CAMPBELL, *Examiner.*